(12) United States Patent
Adiseshan et al.

(10) Patent No.: US 12,032,944 B2
(45) Date of Patent: Jul. 9, 2024

(54) STATE MACHINE OPERATION FOR NON-DISRUPTIVE UPDATE OF A DATA MANAGEMENT SYSTEM

(71) Applicant: Rubrik, Inc., Palo Alto, CA (US)

(72) Inventors: Muthugopalakrishnan Adiseshan, Bangalore (IN); Sai Sandeep Moparthi, Mountain View, CA (US); Ajay Shekar, San Francisco, CA (US); Pankaj Kumar, Santa Clara, CA (US); Ravi C Kondamuru, Sunnyvale, CA (US); Smriti Agrawal, Sunnyvale, CA (US); Srinivasan P S, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 92 days.

(21) Appl. No.: 17/948,137

(22) Filed: Sep. 19, 2022

(65) Prior Publication Data

US 2024/0095011 A1    Mar. 21, 2024

(51) Int. Cl.
*G06F 9/44*    (2018.01)
*G06F 8/65*    (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 7,827,544 | B2 * | 11/2010 | Butt ......................... | G06F 8/65 |
| | | | | 717/172 |
| 9,794,331 | B1 * | 10/2017 | Frasca ...................... | G06F 16/27 |
| 10,969,959 | B2 * | 4/2021 | Somasundaram .... | G06F 3/0605 |
| 11,567,840 | B2 * | 1/2023 | Sarkar .................. | G06F 9/45558 |
| 2012/0222026 | A1 * | 8/2012 | Excoffier .................. | G06F 8/65 |
| | | | | 717/172 |
| 2018/0150230 | A1 * | 5/2018 | Schreter ................ | G06F 9/4498 |
| 2022/0035626 | A1 * | 2/2022 | Kapoor ................... | G06F 8/656 |

* cited by examiner

*Primary Examiner* — Qamrun Nahar
(74) *Attorney, Agent, or Firm* — Holland & Hart LLP

(57) ABSTRACT

Aspects of data management are described. A cluster-level state machine may be instantiated for an update procedure for updating software for a cluster of storage nodes, where the update procedure may be configured to serially update the plurality of storage nodes. The cluster-level state machine may be configured to monitor the update procedure at a cluster level. One or more node-level state machines may be instantiated for the update procedure, where the one or more node-level state machines may be configured to monitor the performance of the update procedure at a storage node level. During an update procedure, the state of the cluster-level state machine may reflect a state of the cluster of storage nodes and the state of a node-level state machine may reflect a state of a respective one or more storage nodes.

20 Claims, 6 Drawing Sheets

STATE MACHINE OPERATION FOR NON-DISRUPTIVE UPDATE OF A DATA MANAGEMENT SYSTEM

FIELD OF TECHNOLOGY

The present disclosure relates generally to data management, including techniques for state machine operation for non-disruptive update of a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

To update the software of a cluster of storage nodes in a non-disruptive manner, an update procedure may serially update subsets (e.g., one or more) of the storage nodes. Accordingly, the storage nodes that are not being updated may continue to support services provided by the cluster of storage nodes throughout the update procedure. As part of a non-disruptive update procedure, certain tasks may be performed on a cluster-wide basis and other tasks may be performed at an individual node-level. Moreover, during the non-disruptive update procedure, the node-level tasks may be performed by different storage nodes at different times— e.g., one storage node may be installing the update while another storage node is preparing to be updated. Thus, a system for keeping track of both cluster-wide operations and node-level operations may be desired for the cluster-wide operations and node-level operations to be performed in harmony with one another.

To support, in a unified way, the management of the independent performance of both cluster-wide and node-level tasks, a cluster-level state machine and one or more nested node-level state machines may be used. The cluster-level state machine and a nested node-level state machine may enable cluster-wide tasks to be performed independent of the node-level tasks. Similarly, multiple nested node-level state machines may enable node-level tasks at one storage node in the cluster to be performed independent of node-level tasks performed at other storage nodes in the cluster.

In some examples, to increase the likelihood of a smooth progression for a non-disruptive update, synchronization points may be designated at certain points of the non-disruptive update. At the synchronization points, testing procedures may be performed on ongoing services to confirm whether the services are proceeding as expected. In some examples, the synchronization points may be coordinated with breakpoints of the ongoing services, where the breakpoints may occur at different points during a workflow of the ongoing services. In some examples, when performed on the ongoing services at the breakpoints, the testing procedures may yield predictable results that can be used to determine whether the services are proceeding as expected.

Figure 1:
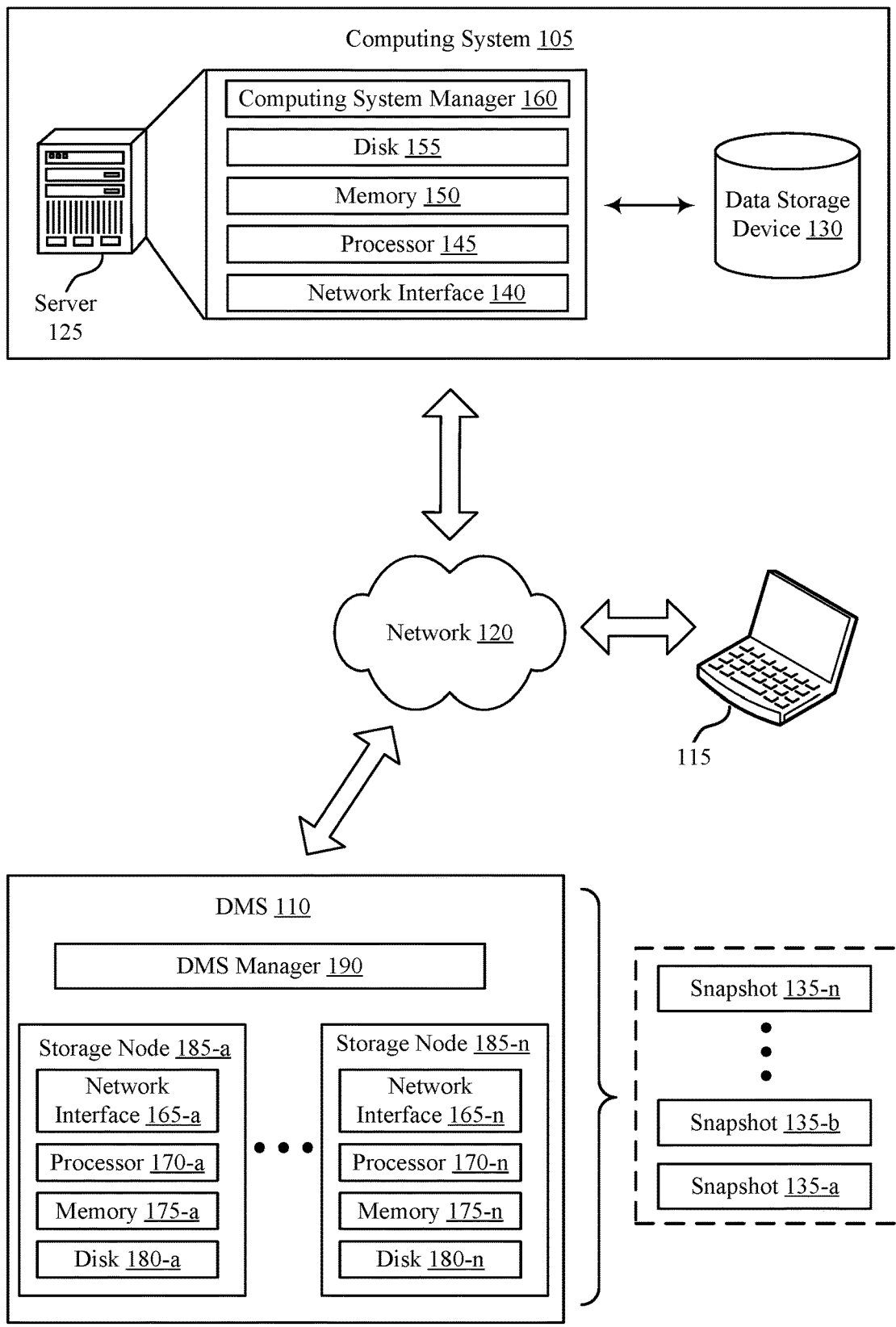
FIG. 1 shows an example of a computing environment that supports state machine operation for non-disruptive update of a data management system in accordance with aspects of the present disclosure.

FIG. 1 illustrates an example of a computing environment 100 that supports state machine operation for non-disruptive update of a data management system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A storage cluster at the DMS 110 may be updated (e.g., upgraded) from a first software version to a second software version—e.g., to improve performance, stability, and/or security; to add new services; etc. As part of the procedure for updating the storage cluster, each of the storage nodes 185 may be updated from the first software version to the second software version. To perform the update procedure, each of the storage nodes may be taken offline while the update procedure is performed. A duration for performing the update procedure may last tens of minutes or hours. Accordingly, the services provided by the storage cluster may be temporarily unavailable until the update procedure is completed. An update procedure that causes the storage cluster to be taken offline may be referred to as a "disruptive" update procedure.

Alternatively, a "non-disruptive" update procedure may be performed to update the storage cluster. As part of the non-disruptive update procedure, individual (or groups of) storage nodes may be updated from the first software version to the second software version (e.g., on a serial or one-byone basis). A procedure for serially updating the storage nodes may be referred to as a rolling update procedure. Accordingly, the storage cluster may continue to provide services (remain online) throughout the update procedure. That is, the storage nodes not being currently updated may be used to support the services provided by the storage cluster. Since a non-disruptive update procedure may involve individually updating the storage nodes 185 (or groups of the storage nodes 185), a duration for performing the non-disruptive update procedure may last hours or days. For example, the duration of the non-disruptive update procedure may include the collective time of individually updating each of the storage nodes 185.

As described herein, as part of a disruptive update, the storage nodes 185 may each perform the tasks of the disruptive update concurrently. That is, the tasks of a disruptive update may be performed on a cluster-wide basis (e.g., across the storage nodes 185). As also described herein, as part of a non-disruptive update, certain tasks may be performed on a cluster-wide basis and other tasks may be performed at an individual node-level. Moreover, during the non-disruptive update procedure, the node-level tasks may be performed by different storage nodes at different times—e.g., one storage node may be installing the update while another storage node is preparing to be updated. Thus, the DMS 110 may need to keep track of both cluster-wide operations and node-level operations so that the cluster-wide operations and node-level operations can be performed in harmony with one another.

To support, in a unified way, the management of the independent performance of both cluster-wide and node-level tasks, a cluster-level state machine and one or more nested node-level state machines may be used. The cluster-level state machine and a nested node-level state machine may enable cluster-wide tasks to be performed independent of the node-level tasks. Similarly, multiple nested node-level state machines may enable node-level tasks at one storage node in the cluster to be performed independent of node-level tasks performed at other storage nodes in the cluster.

In some examples, the DMS manager 190 (or a "driving storage node" of the storage nodes 185 that is designated as the driving node for the update procedure) may instantiate a cluster-level state machine for an update procedure for updating the software of the storage nodes 185 from a first version to a second version. The update procedure may be configured to serially update subsets of the storage nodes 185, where a subset of the storage nodes 185 may include one or more of the storage nodes 185. The cluster-level state machine may be configured to monitor the performance of the update procedure at a cluster level that spans the storage nodes 185.

The DMS manager 190 (or the driving storage node of the storage nodes 185) may also instantiate one or more node-level state machines based on the update procedure being initiated. In some examples, a single node-level state machine is instantiated and used for each of the storage nodes 185. In other examples, multiple node-level state machines are instantiated, where each of the node-level state machines may correspond to a respective storage node of the storage nodes 185. The one or more node-level state machines may be configured to monitor the performance of the update procedure at a storage node level that is specific to a respective subset of the storage nodes 185. Based on instantiating the cluster-level and node-level state machines, the DMS manager 190 (or the driving storage node of the storage nodes 185) may perform the update procedure. During the update procedure, a state of the cluster-level state machine may reflect a state of the cluster of storage nodes, and a state of a node-level state machine may reflect a state of a respective subset of the storage nodes 185.

By instantiating nested node-level state machines, storage nodes (such as the storage nodes 185) may be individually controlled and monitored throughout the non-disruptive update procedure. Additionally, the nested node-level state machines may bring flexibility to the execution of the non-disruptive update procedure. That is, the nested node-level state machines may enable an update orchestrator (e.g., the DMS 110 or the driving node) to trigger multiple storage nodes to perform concurrent and standalone operations. Thus, by configuring (or reconfiguring) the nested node-level state machines, the update orchestrator may be able to dynamically modify the operation of a non-disruptive update procedure—e.g., so that for one update procedure, certain update tasks may be performed concurrently, at particular times, or both, while for another update procedure, different update tasks may be performed concurrently, at different times, or both.

To increase the likelihood of a smooth progression for a non-disruptive update, synchronization points may be designated at certain points of the non-disruptive update. At the synchronization points, testing procedures may be performed on ongoing services to confirm whether the services are proceeding as expected. In some examples, the synchronization points may be coordinated with breakpoints of the ongoing services, where the breakpoints may occur at different points during a workflow of the ongoing services. In some examples, when performed on the ongoing services at the breakpoints, the testing procedures may yield predictable results that can be used to determine whether the services are proceeding as expected.

In some examples, during an update procedure, the DMS manager 190 (or the driving storage node of the storage nodes 185) may reach a synchronization point. Based on reaching the synchronization point, the data management system (or the driving storage node of the storage nodes 185) may pause the update procedure. While paused, the data management system (or the driving storage node of the storage nodes 185) may perform a testing procedure for one or more services that run during the update procedure to determine whether the one or more services are running as expected. If the data management system (or the driving storage node of the storage nodes 185) determines that the service is running as expected, the data management system (or the driving storage node of the storage nodes 185) may resume the update. Otherwise, the data management system (or the driving storage node of the storage nodes 185) may indicate, via a user interface, that an error was identified in the service. In some examples, the data management system (or the driving storage node of the storage nodes 185) may remain in the paused state after detecting the error.

By designating synchronization points during a non-disruptive update procedure for testing ongoing services, an update orchestrator (e.g., the DMS 110) may confirm whether the ongoing services are behaving as expected. Moreover, if the update orchestrator determines that the ongoing services aren't behaving as expected, the update orchestrator may determine that an error has occurred during the update procedure. In some examples, the update orchestrator may diagnose and provide a user with a diagnosis of the error as well as resume the update—e.g., if the user corrects or chooses to ignore the error.

In some examples, the cluster-level and node-level state machines coordinate with the pausing and resuming of an update procedure at a synchronization point. That is, when an update procedures is paused, the cluster-wide and node-specific states of the storage nodes 185 may be saved. In some examples, the cluster-wide and node-specific states may be used to resume the update procedure at a later time—e.g., after the testing procedure completes.

Figure 2:
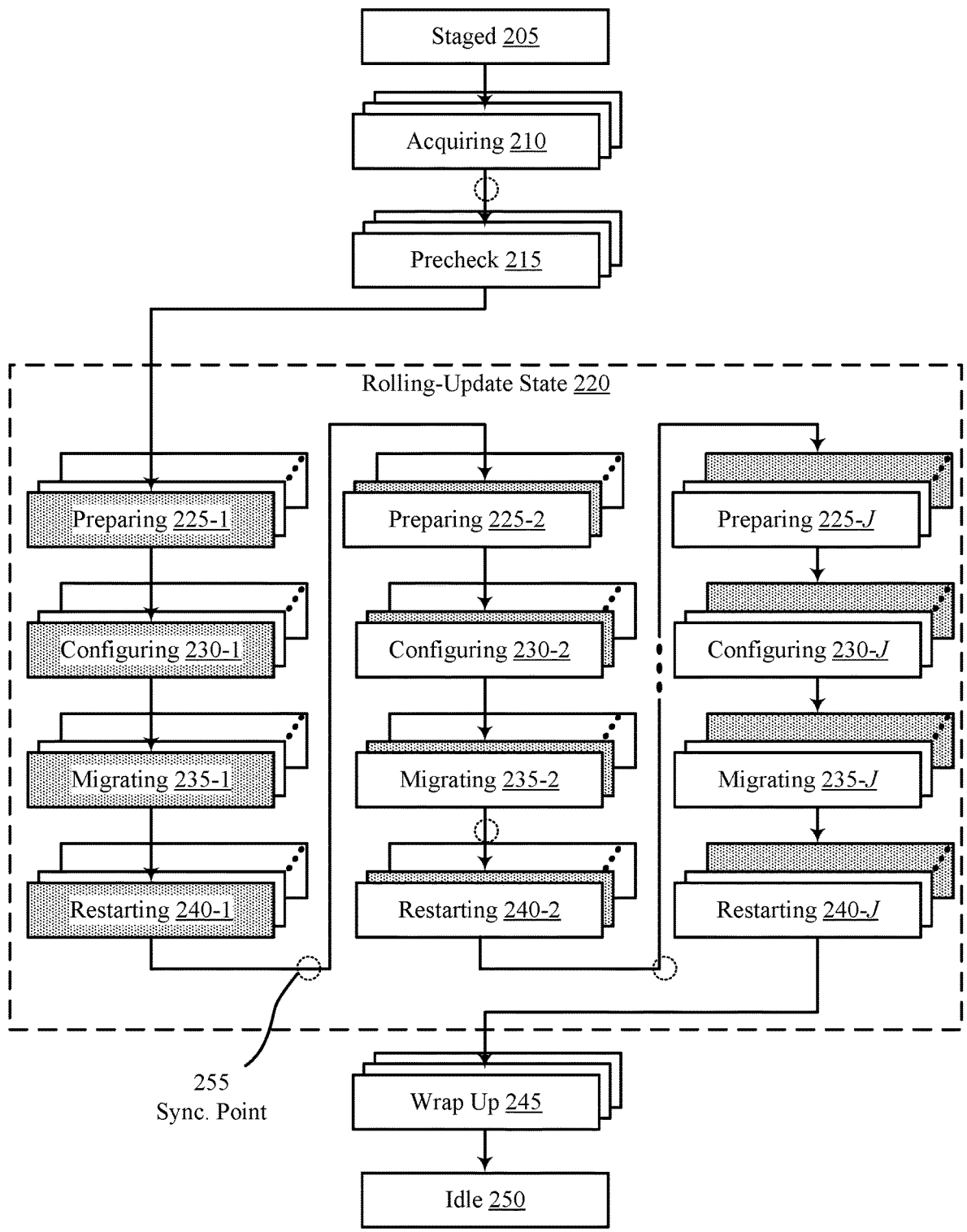
FIG. 2 shows an example of a state diagram that supports state machine operation for non-disruptive update of a data management system in accordance with examples as disclosed herein.

FIG. 2 shows an example of a state diagram that supports state machine operation for non-disruptive update of a data management system in accordance with examples as disclosed herein.

The state diagram 200 may depict the different states of a data management cluster during a non-disruptive update procedure. The state diagram 200 may include cluster-wide states that include first tasks that are performed on the storage nodes collectively, and node-level tasks that are performed on storage nodes individually. The state diagram 200 may depict the operation of a cluster-wide state machine associated with the data management cluster as well as one or more nested node-level state machines associated with the storage nodes. A nested node-level state machine may also be referred to as a rolling update (RU) state machine.

Based on receiving an indication that an update for the data management cluster is available, the cluster-wide state machine and the data management cluster may enter the staged state 205. Based on entering the staged state 205, the data management cluster may be ready for a procedure for non-disruptively updating the data management cluster from a first software version to a second software version to be initiated. In some examples, prior to entering the staged state 205, the data management cluster may download the update and confirm the integrity of the update, for example. In some examples, each storage node in the data management cluster may concurrently (e.g., simultaneously) transition to the staged state 205 together.

After the staged state 205 is entered and the rolling update is initiated, the cluster-wide state machine and data management cluster may enter the acquiring state 210. Based on entering the acquiring state 210, the data management cluster may acquire an update-lock protecting the data management cluster from changes that would interfere with the rolling update process.

In some examples, before proceeding with the rolling update, the cluster-wide state machine and the data management cluster may enter the precheck state 215. While in the precheck state 215, the data management cluster may perform one or more checks to determine whether to proceed with the rolling update. In some examples, the data management cluster performs one or more cluster-wide (or system-wide) checks to determine whether to proceed with the rolling update. Additionally, or alternatively, the data management cluster may perform one more individual node-level checks to determine whether to proceed with the rolling update. In some examples, a deploying state may be inserted between the acquiring state 210 and the precheck state 215. The deploying state may be used to deploy the update to the storage nodes.

Based on passing the prechecks and/or addressing any outstanding items raised by the prechecks, a status of the storage nodes may be set to OK (which may indicate to the services being run by the data management cluster that the storage node is available to support the services), and the cluster-wide state machine and the data management cluster may enter the rolling update state 220. Based on entering the rolling update state 220, a plan for updating the data management cluster may be determined. For example, the plan may designate an order for updating the storage nodes (e.g., individually or in groups). Also, a node-level finite state machine (which may be referred to as a state machine) may be instantiated. In some examples, a state machine is instantiated for each storage node (e.g., of N storage nodes) or for sets of the storage nodes in the data management cluster. Though, in some examples, the state machines may be instantiated prior to entering the rolling update state 220 (e.g., when the staged state 205 is entered). Based on instantiating the state machines, the states of the state machines and state handlers for the various states may be established.

The states of the individual state machines may be represented by the overlaid boxes, such that the frontmost boxes may correspond to a first state machine for a first storage node, the intermediary boxes may correspond to a second state machine for a second storage node, and the backmost boxes may correspond to a third state machine for an Nth storage node. Each state machine may include a preparing state, a configuring state, a migrating state, and a restarting state. In some examples, each state machine may also include a done state to indicate that the update at a corresponding node is complete.

The state machines may perform the tasks of some states in parallel. That is, the storage nodes may perform the tasks of some states concurrently—e.g., one or more tasks of the preparing state. While the tasks of other states may be performed serially. That is, the storage nodes may not perform certain tasks until certain tasks are completed by a particular storage node—e.g., one storage node may not perform the tasks of the configuring, migrating, and restarting states until a particular storage node completes the tasks of the configuring, migrating, and restarting states; another storage node may not perform the tasks of the configuring, migrating, and restarting states until the one storage node completes tasks of the configuring, migrating, and restarting states, and so on. In some examples, which tasks are performed by the storage nodes serially or in parallel may be modified by modifying the operation of the individual nested state machines. In some examples, for each task performed for a state machine, a file may be updated before and after the task is performed to record the current state and quantity of tasks performed by each node. After completing the tasks of a current state, a state machine may proceed to the next state. In some examples, if the state machine encounters an error, the state machine, the rolling update, or both, may be paused.

After the rolling update state 220 is entered and the state machines are instantiated, a first state machine at the first storage node may enter the preparing state. In some examples, based on entering the first preparing state 225-1, the first storage node corresponding to the first state machine may stop providing services and identify ongoing jobs for the services. Also, a status of the first storage node may be set to UPDATE (to indicate that the first storage node is being updated). In some examples, the first storage node may perform a quick reboot. While the first storage node is in the first preparing state 225-1, a status of the other storage nodes corresponding to the other state machines may be set to OK. While the OK status is set, the other storage nodes may continue to execute ongoing jobs to support services provided by the data management cluster.

The first state machine and the first storage node may then proceed to the first configuring state 230-1. While in the first configuring state 230-1, the first storage node may configure a secondary partition with system settings, apply platform specific changes, and perform a regular reboot. In some examples, the first storage node may make additions and/or modifications to the configuration of an operating system of the first storage node, the data management software of the first storage node, or both. In some examples, the first storage node may make additions and/or modifications to the configuration of virtual machines, physical machines, or both. A configuration may include configuration parameters, where each configuration parameter may have a specified value.

Based on updating the configurations, the first state machine and the first storage node may then proceed to the first migrating state 235-1. While in the first migrating state 235-1, the first storage node may prepare the updated software version for operation. For example, the first storage node may convert existing data into different forms; populate, modify, or remove a schema added in the updated software version; populate, modify, or remove entries of a schema modified in the updated software versions; and the like.

After initializing the updated software version, the first state machine and first storage node may enter the first restarting state 240-1. While in the first restarting state 240-1, the first storage node may restart itself—e.g., so that the first storage node (the services provided by the first storage node) may begin operating in accordance with the updated software version. In some examples, after successfully restarting, the first state machine and the first storage node may transition to a done state and a status of the first storage node may be reset to OK.

Based on the first storage node successfully restarting, a next state machine and a next storage node may enter and perform the tasks of the second preparing state 225-2. Also, a status of the next storage node may be set to UPDATE. After completing the tasks of the second preparing state 225-2, the next state machine and the next storage node may proceed through the second configuring state 230-2, the second migrating state 235-2, and the second restarting state 240-2 of the second state machine, as similarly described with reference to the first storage node. Based on the next storage node successfully restarting, a following state machine and following storage node may proceed through the tasks of the preparing and subsequent states. And so on—e.g., until all of the storage nodes have been updated.

Based on a last storage node (e.g., the $J^{th}$ storage node 225-J) exiting the last restarting state (e.g., the $J^{th}$ restarting state 240-J), the cluster-wide state machine may proceed to the wrap-up state 245. In some examples, the $J^{th}$ storage node 225-J is the storage node that drives the rolling update procedure (and may be referred to as the driving node). While in the wrap-up state 245, certain data in the storage nodes may be deleted (e.g., cleaned-up)—e.g., data that is preferable not to delete during the rolling update, such as old or obsolete metadata, system configurations, and the like. In some examples, destructive schema changes may also be performed while in the wrap-up state. Additionally, an update status of OK may be designated for the data management cluster (to indicate that the rolling update was completed successfully). After completing the wrap-up operations, the cluster-wide state machine may proceed to the idle state 250.

In some examples, the cluster-wide and node-level state machines may be used to flexibly configure the execution of non-disruptive update procedures. For example, node-level changes to an update procedure may be made by modifying the tasks of the node-level state machines without otherwise affecting cluster-wide operations. Also, changes may be made at an individual node-level by modifying tasks of a particular node-level state machine without otherwise affecting cluster-wide operations or node-level operations at other nodes. For example, for one storage node, a corresponding node-level state machine may be modified so that tasks that are performed by other storage nodes while in the configuring state are instead performed by the one storage node while in the preparing state. Accordingly, the state machine configuration described herein may enable minor modifications to be easily made to the execution of different non-disruptive update procedures—e.g., to accommodate peculiarities of different non-disruptive update procedures, to reduce a duration of non-disruptive update procedures when possible, etc. Thus, the state machine configuration described herein, may be used to improve the reliability of non-disruptive update procedures, to increase a likelihood that an update is able to be installed non-disruptively, or both.

In some examples, one or more synchronization points (such as synchronization point 255) may be designated during the non-disruptive update procedure. The synchronization points may be depicted by circles with broken lines. In some examples, the synchronization points are positioned at critical points in the update procedure—e.g., after a quantity (e.g., half) of the storage nodes have been updated, after configurations have been changed, after metadata has been migrated, etc. Additionally, or alternatively, the synchronization points are positioned at points in the update procedure from which the update procedure can be resumed smoothly. In some examples, a paused field is included in the finite state machines—e.g., to notify the data management cluster that the update is paused intentionally. The paused field may be set to true in a finite state machine when a synchronization point for the finite state machine is reached, and false otherwise. Additionally, a field may be used to store the current synchronization point information for the update procedure—e.g., to ensure that a synchronization point does not cause the update procedure to be paused twice in the case of a reboot or restart. The synchronization point may indicate whether to pause the update procedure when a state is entered or exited, at the start or completion of a task (e.g., at the completion of a first task performed during the second migrating state 235-2), or both.

When a synchronization point is reached, the update procedure may transition to a paused state. In some examples, the synchronization point may indicate points at which multiple of the storage nodes are to pause—e.g., in states from which the update procedure can be resumed smoothly. The points may be different for different storage nodes based on a progression of the update procedure. While paused, the update procedure may enable testing and debugging procedures to be performed for ongoing services (e.g., snapshot service) that continue to be executed by the storage nodes during the upgrade process. In some examples, the testing procedures may be performed in accordance with breakpoints of the ongoing services that pause the service for a duration that overlaps-in-time with the duration that the data management cluster is paused by a synchronization point. When a service is paused by a breakpoint, a test corresponding to the breakpoint may be performed, where the test may reveal whether the service has performed as expected during the non-disruptive update. In some examples, the test may identify an error in the service and, in some examples, a cause of the error.

If the one or more testing procedures performed at the synchronization point indicate that the tested services are performing as expected, the update procedure may resume. Otherwise, the update procedure may remain paused. Based on an error being detected, the data management cluster may indicate (e.g., to a user via a user interface) that an error has been detected in one or more services during the update procedure. In some examples, the data management cluster may indicate the cause (e.g., limited storage space, IP address conflict, etc.) of the error, recommendations for correcting the error, or both.

In some examples, the data management cluster may receive (e.g., via the user interface) input that resolves the error. For example, the data management cluster may receive confirmation that the cause of the error has been addressed, a request from the user to terminate the one or more services in which the error was identified, or both. In such cases, the data management cluster may resume the update procedure from the synchronization point.

In some examples, rather than pausing at a synchronization point, the update procedure may skip one or more tasks (e.g., an update image validation task) associated with the synchronization point. In some cases, the update procedure may skip to the next synchronization point. In some examples, based on skipping the one or more tasks and before proceeding with the update procedure, one or more testing procedures may be performed to determine whether the tested services are performing as expected. By using synchronization points to skip tasks, the execution of an update procedure for a software update (e.g., a not yet released software update procedure for a not yet released update) may be tested without performing unnecessary tasks and with lower latency.

Figure 3:
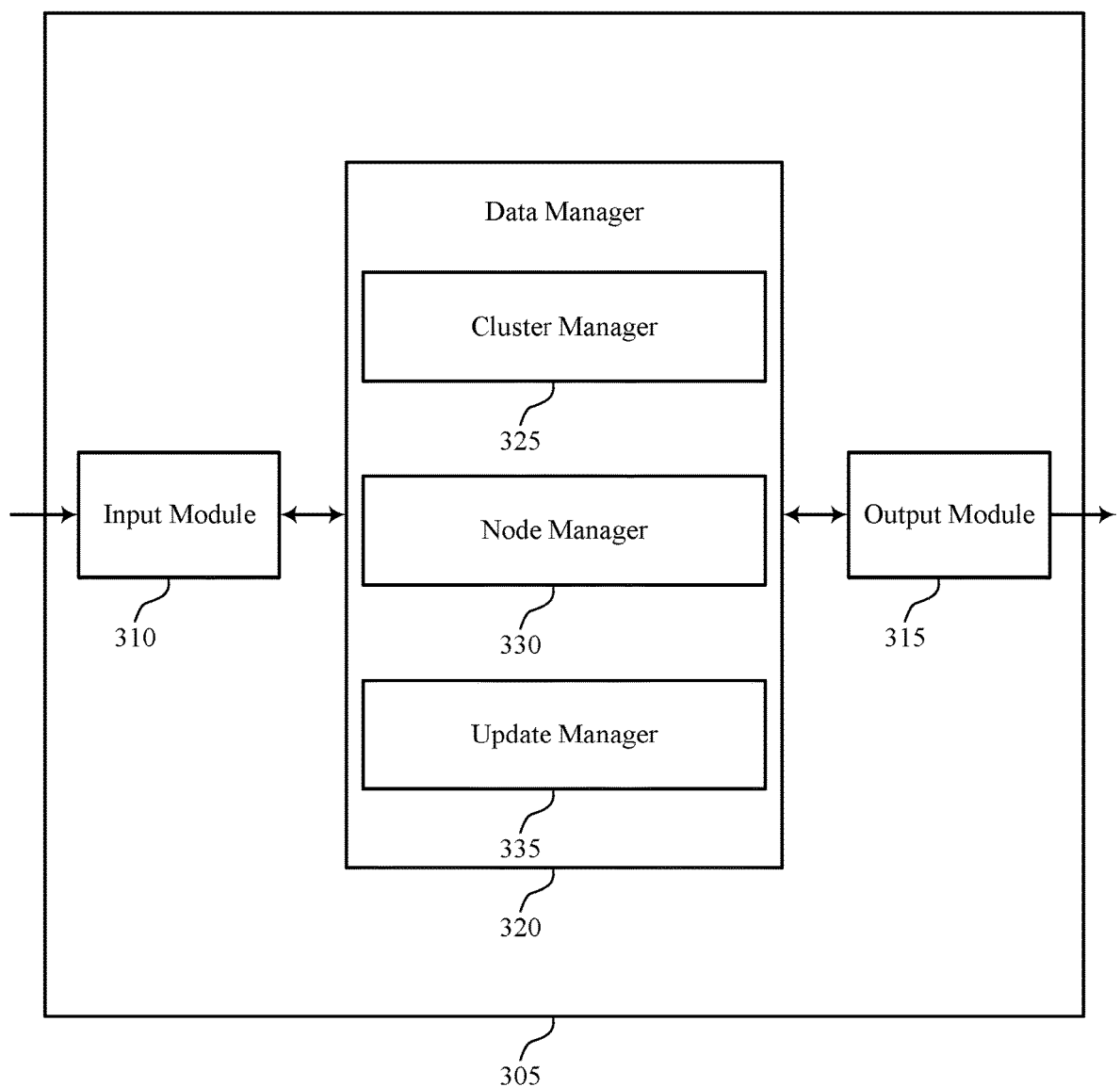
FIG. 3 shows a block diagram of an apparatus that supports state machine operation for non-disruptive update of a data management system in accordance with aspects of the present disclosure.

FIG. 3 shows a block diagram 300 of a system 305 that supports state machine operation for non-disruptive update of a data management system in accordance with aspects of the present disclosure. In some examples, the system 305 may be an example of aspects of one or more components described with reference to FIG. 1, such as a DMS 110. The system 305 may include an input interface 310, an output interface 315, and a data manager 320. The system 305 may also include one or more processors. Each of these components may be in communication with one another (e.g., via one or more buses, communications links, communications interfaces, or any combination thereof).

The input interface 310 may manage input signaling for the system 305. For example, the input interface 310 may receive input signaling (e.g., messages, packets, data, instructions, commands, or any other form of encoded information) from other systems or devices. The input interface 310 may send signaling corresponding to (e.g., representative of or otherwise based on) such input signaling to other components of the system 305 for processing. For example, the input interface 310 may transmit such corresponding signaling to the data manager 320 to support state machine operation for non-disruptive update of a data management system. In some cases, the input interface 310 may be a component of a network interface 515 as described with reference to FIG. 5.

The output interface 315 may manage output signaling for the system 305. For example, the output interface 315 may receive signaling from other components of the system 305, such as the data manager 320, and may transmit such output signaling corresponding to (e.g., representative of or otherwise based on) such signaling to other systems or devices. In some cases, the output interface 315 may be a component of a network interface 515 as described with reference to FIG. 5.

The data manager 320 may include a cluster manager 325, a node manager 330, an update manager 335, or any combination thereof. In some examples, the data manager 320, or various components thereof, may be configured to perform various operations (e.g., receiving, monitoring, transmitting) using or otherwise in cooperation with the input interface 310, the output interface 315, or both. For example, the data manager 320 may receive information from the input interface 310, send information to the output interface 315, or be integrated in combination with the input interface 310, the output interface 315, or both to receive information, transmit information, or perform various other operations as described herein.

The cluster manager 325 may be configured as or otherwise support a means for instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes. The node manager 330 may be configured as or otherwise support a means for instantiating, by the data management system, one or more node-level state machines responsive to the update procedure being initiated, where the one or more node-level state machines are configured to monitor the performance of the update procedure at a storage node level that is specific to a respective subset of the set of multiple storage nodes. The update manager 335 may be configured as or otherwise support a means for performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine. A subset of storage nodes may include one or more storage nodes.

Figure 4:
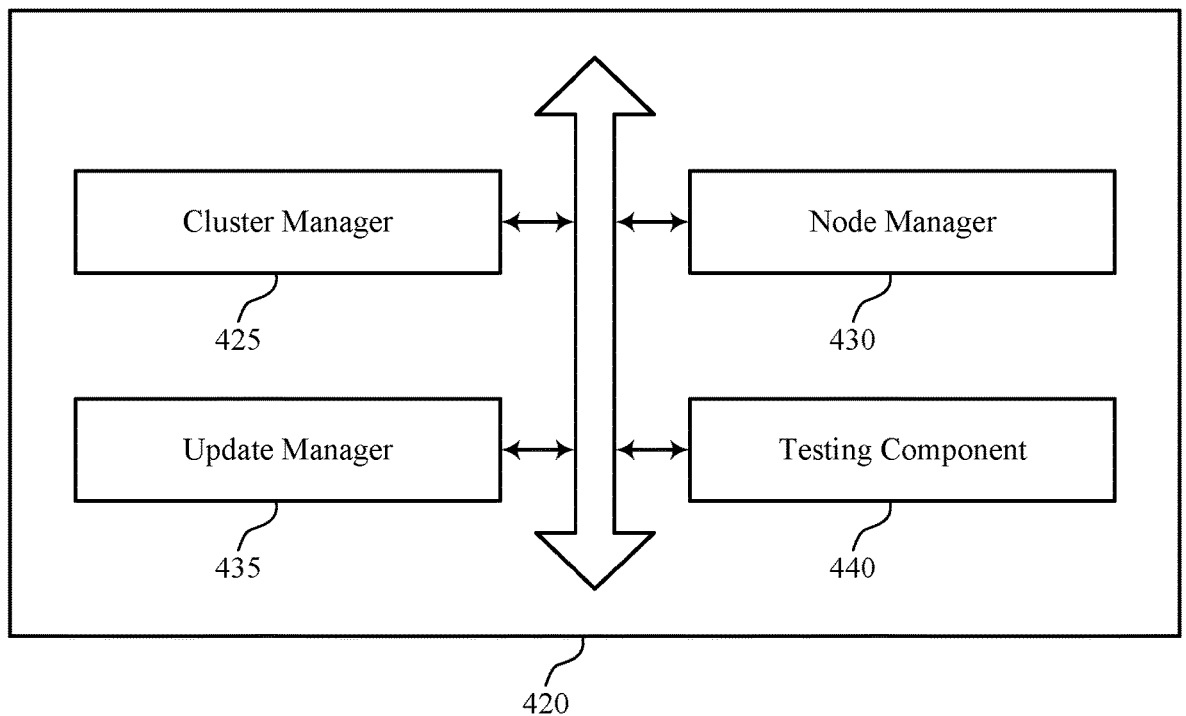
FIG. 4 shows a block diagram of a storage manager that supports state machine operation for non-disruptive update of a data management system in accordance with aspects of the present disclosure.

FIG. 4 shows a block diagram 400 of a data manager 420 that supports state machine operation for non-disruptive update of a data management system in accordance with aspects of the present disclosure. The data manager 420 may be an example of or include aspects of a data manager 320 as described herein. The data manager 420, or various components thereof, may be an example of means for performing various aspects of techniques for state machine operation for non-disruptive update of a data management system as described herein. For example, the data manager 420 may include a cluster manager 425, a node manager 430, an update manager 435, a testing component 440, or any combination thereof. Each of these components may communicate, directly or indirectly, with one another (e.g., via one or more buses, communications links, communications interfaces, or any combination thereof).

The cluster manager 425 may be configured as or otherwise support a means for instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes. The node manager 430 may be configured as or otherwise support a means for instantiating, by the data management system, one or more node-level state machines responsive to the update procedure being initiated, where the one or more node-level state machines are configured to monitor the performance of the update procedure at a storage node level that is specific to a respective subset of the set of multiple storage nodes. The update manager 435 may be configured as or otherwise support a means for performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

In some examples, instantiating the one or more node-level state machines includes instantiating a respective node-level state machine for each storage node in the cluster of storage nodes.

In some examples, the cluster manager 425 may be configured as or otherwise support a means for transitioning, based on performing the update procedure, the cluster-level state machine to a rolling-update state, where the rolling-update state is associated with serially updating the subsets of the set of multiple storage nodes.

In some examples, the cluster-level state machine remains in a rolling-update state while the subsets of the set of multiple storage nodes are serially updated, and each of the one or more node-level state machines undergoes one or more state transitions while the respective subset of the set of multiple storage nodes for the node-level state machine is being updated.

In some examples, the node manager 430 may be configured as or otherwise support a means for initiating, based on the cluster-level state machine entering a rolling-update state for serially updating the set of multiple storage nodes, a preparing state at the one or more node-level state machines, where the set of multiple storage nodes are prepared for updating while the one or more node-level state machines are in the preparing state.

In some examples, the node manager 430 may be configured as or otherwise support a means for initiating an update for a subset of the set of multiple storage nodes based on the cluster-level state machine entering a rolling-update state for serially updating the set of multiple storage nodes, where the node-level state machine of the one or more node-level state machines corresponds to the subset of the set of multiple storage nodes. In some examples, the node manager 430 may be configured as or otherwise support a means for transitioning, by the node-level state machine, from a preparing state to a configuring state based on the update being initiated for the node-level state machine, where system parameters of the second version are configured at the subset of the set of multiple storage nodes while the node-level state machine is in the configuring state.

In some examples, a set of multiple node-level state machines of the one or more node-level state machines remain in the preparing state while the node-level state machine transitions from the preparing state to the configuring state.

In some examples, the node manager 430 may be configured as or otherwise support a means for transitioning, by the node-level state machine, from the configuring state to a migrating state, where values of the system parameters of the first version are transferred to corresponding system parameters of the second version while the node-level state machine is in the migrating state.

In some examples, the node manager 430 may be configured as or otherwise support a means for transitioning, by the node-level state machine, from the migrating state to a restarting state, where the subset of the set of multiple storage nodes are restarted while the node-level state machine is in the restarting state. In some examples, the node manager 430 may be configured as or otherwise support a means for transitioning, by a second node-level state machine of the one or more node-level state machines, from the preparing state to the configuring state based on the node-level state machine exiting the restarting state.

In some examples, the update manager 435 may be configured as or otherwise support a means for reaching a synchronization point in the update procedure.

In some examples, the update manager 435 may be configured as or otherwise support a means for pausing the update procedure based on reaching the synchronization point. In some examples, the testing component 440 may be configured as or otherwise support a means for performing a testing procedure for a service that is supported by the cluster of storage nodes during the update procedure.

In some examples, the testing component 440 may be configured as or otherwise support a means for determining that the service is running during the update procedure as expected based on the testing procedure. In some examples, the update manager 435 may be configured as or otherwise support a means for resuming the update procedure based on determining that the service is running as expected.

In some examples, the testing component 440 may be configured as or otherwise support a means for identifying an error in the service based on the testing procedure. In some examples, the update manager 435 may be configured as or otherwise support a means for sending, via a user interface, an indication of the error in the service.

In some examples, the update manager 435 may be configured as or otherwise support a means for receiving, via the user interface, an input that addresses the error in the service. In some examples, the update manager 435 may be configured as or otherwise support a means for resuming the update procedure based on the error being addressed.

In some examples, the update manager 435 may be configured as or otherwise support a means for skipping a task associated with the synchronization point, a state associated with the synchronization point, or both, based on reaching the synchronization point.

In some examples, the synchronization point is reached after updating a first storage node of the set of multiple storage nodes and before updating a second storage node of the set of multiple storage nodes. In some examples, half of the set of multiple storage nodes have been updated after the first storage node is updated.

Figure 5:
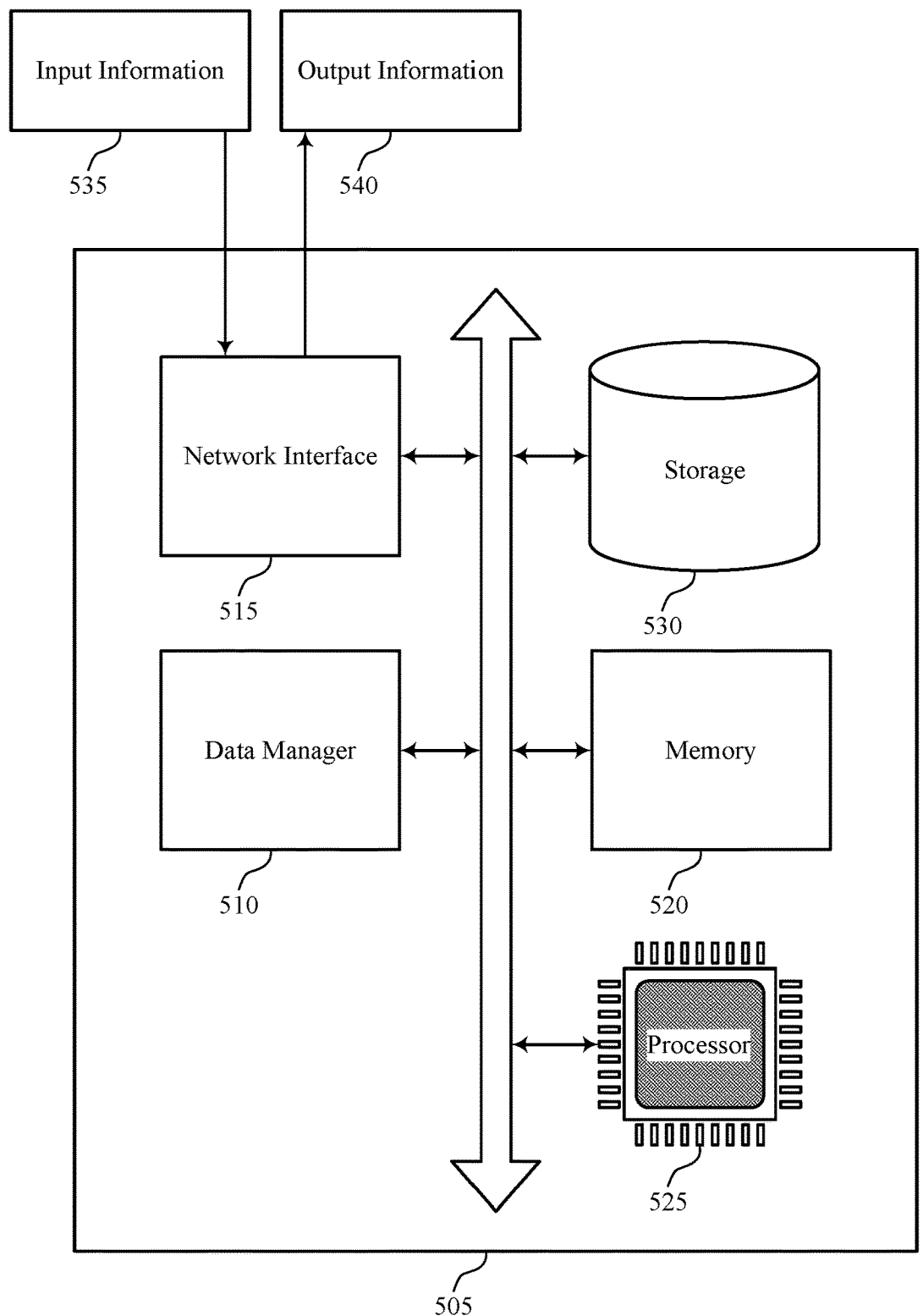
FIG. 5 shows a block diagram of a system including a device that supports state machine operation for non-disruptive update of a data management system in accordance with aspects of the present disclosure.

FIG. 5 shows a block diagram 500 of a system 505 that supports state machine operation for non-disruptive update of a data management system in accordance with aspects of the present disclosure. The system 505 may be an example of or include aspects of a system 305 as described herein. The system 505 may include components for data management, including components such as a data manager 510, a network interface 515, memory 520, processor 525, and storage 530. These components may be in electronic communication or otherwise coupled with each other (e.g., operatively, communicatively, functionally, electronically, electrically; via one or more buses, communications links, communications interfaces, or any combination thereof). Additionally, the components of the system 505 may comprise corresponding physical components or may be implemented as corresponding virtual components (e.g., components of one or more virtual machines). In some examples, the system 505 may be an example of aspects of one or more components described with reference to FIG. 1, such as a DMS 110.

The network interface 515 may enable the system 505 to exchange information (e.g., input information 535, output information 540, or both) with other systems or devices (not shown). For example, the network interface 515 may enable the system 505 to connect to a network (e.g., a network 120 as described herein). The network interface 515 may include one or more wireless network interfaces, one or more wired network interfaces, or any combination thereof. In some examples, the network interface 515 may be an example of may be an example of aspects of one or more components described with reference to FIG. 1, such as one or more network interfaces 165.

Memory 520 may include RAM, ROM, or both. The memory 520 may store computer-readable, computer-executable software including instructions that, when executed, cause the processor 525 to perform various functions described herein. In some cases, the memory 520 may contain, among other things, a basic input/output system (BIOS), which may control basic hardware or software operation such as the interaction with peripheral components or devices. In some cases, the memory 520 may be an example of aspects of one or more components described with reference to FIG. 1, such as one or more memories 175.

The processor 525 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 525 may be configured to execute computer-readable instructions stored in a memory 520 to perform various functions (e.g., functions or tasks supporting state machine operation for non-disruptive update of a data management system). Though a single processor 525 is depicted in the example of FIG. 5, it is to be understood that the system 505 may include any quantity of one or more of processors 525 and that a group of processors 525 may collectively perform one or more functions ascribed herein to a processor, such as the processor 525. In some cases, the processor 525 may be an example of aspects of one or more components described with reference to FIG. 1, such as one or more processors 170.

Storage 530 may be configured to store data that is generated, processed, stored, or otherwise used by the system 505. In some cases, the storage 530 may include one or more HDDs, one or more SDDs, or both. In some examples, the storage 530 may be an example of a single database, a distributed database, multiple distributed databases, a data store, a data lake, or an emergency backup database. In some examples, the storage 530 may be an example of one or more components described with reference to FIG. 1, such as one or more network disks 180.

The data manager 510 may be configured as or otherwise support a means for instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes. The data manager 510 may be configured as or otherwise support a means for instantiating, by the data management system, one or more node-level state machines responsive to the update procedure being initiated, where the one or more node-level state machines are configured to monitor the performance of the update procedure at a storage node level that is specific to a respective subset of the set of multiple storage nodes. The data manager 510 may be configured as or otherwise support a means for performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

Figure 6:
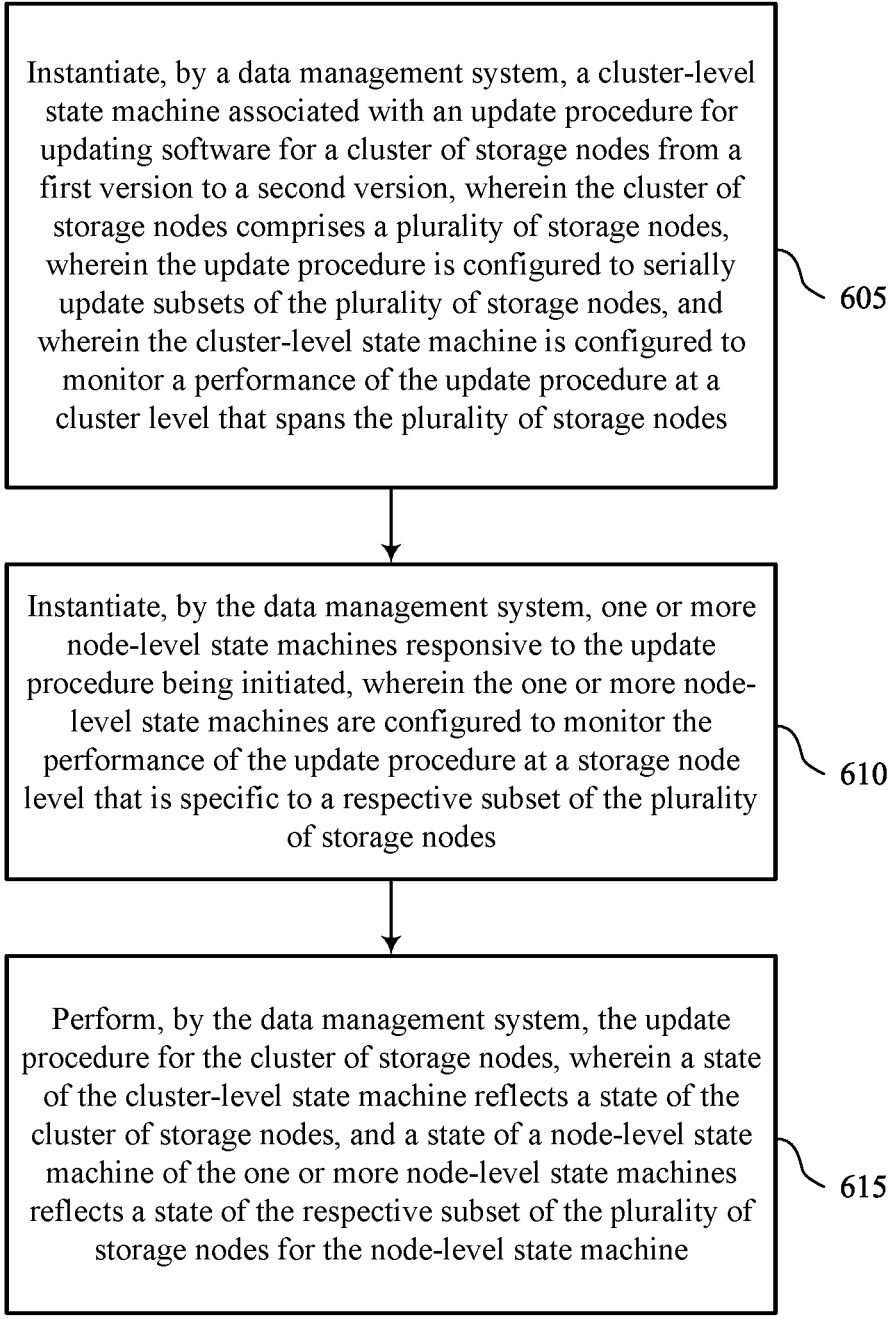
FIG. 6 shows a flowchart illustrating methods that support state machine operation for non-disruptive update of a data management system in accordance with aspects of the present disclosure.

FIG. 6 shows a flowchart illustrating a method 600 that supports state machine operation for non-disruptive update of a data management system in accordance with aspects of the present disclosure. The operations of the method 600 may be implemented by a system or its components as described herein. For example, the operations of the method 600 may be performed by a DMS as described with reference to FIGS. 1 through 5. In some examples, a DMS may execute a set of instructions to control the functional elements of the DMS to perform the described functions. Additionally, or alternatively, the DMS may perform aspects of the described functions using special-purpose hardware.

At 605, the method may include instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes. The operations of 605 may be performed in accordance with examples as disclosed herein. In some examples, aspects of the operations of 605 may be performed by a cluster manager 425 as described with reference to FIG. 4.

At 610, the method may include instantiating, by the data management system, one or more node-level state machines responsive to the update procedure being initiated, where the one or more node-level state machines are configured to monitor the performance of the update procedure at a storage node level that is specific to a respective subset of the set of multiple storage nodes. The operations of 610 may be performed in accordance with examples as disclosed herein. In some examples, aspects of the operations of 610 may be performed by a node manager 430 as described with reference to FIG. 4.

At 615, the method may include performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine. The operations of 615 may be performed in accordance with examples as disclosed herein. In some examples, aspects of the operations of 615 may be performed by an update manager 435 as described with reference to FIG. 4.

A method is described. The method may include instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes, instantiating, by the data management system, one or more node-level state machines responsive to the update procedure being initiated, where the one or more node-level state machines are configured to monitor the performance of the update procedure at a storage node level that is specific to a respective subset of the set of multiple storage nodes, and performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

An apparatus is described. The apparatus may include a processor, memory coupled with the processor, and instructions stored in the memory. The instructions may be executable by the processor to cause the apparatus to instantiate, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes, instantiate, by the data management system, one or more node-level state machines responsive to the update procedure being initiated, where the one or more node-level state machines are configured to monitor the performance of the update procedure at a storage node level that is specific to a respective subset of the set of multiple storage nodes, and perform, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

Another apparatus is described. The apparatus may include means for instantiating, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes, means for instantiating, by the data management system, one or more node-level state machines responsive to the update procedure being initiated, where the one or more node-level state machines are configured to monitor the performance of the update procedure at a storage node level that is specific to a respective subset of the set of multiple storage nodes, and means for performing, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

A non-transitory computer-readable medium storing code is described. The code may include instructions executable by a processor to instantiate, by a data management system, a cluster-level state machine associated with an update procedure for updating software for a cluster of storage nodes from a first version to a second version, where the cluster of storage nodes includes a set of multiple storage nodes, where the update procedure is configured to serially update subsets of the set of multiple storage nodes, and where the cluster-level state machine is configured to monitor a performance of the update procedure at a cluster level that spans the set of multiple storage nodes, instantiate, by the data management system, one or more node-level state machines responsive to the update procedure being initiated, where the one or more node-level state machines are configured to monitor the performance of the update procedure at a storage node level that is specific to a respective subset of the set of multiple storage nodes, and perform, by the data management system, the update procedure for the cluster of storage nodes, where a state of the cluster-level state machine reflects a state of the cluster of storage nodes, and a state of a node-level state machine of the one or more node-level state machines reflects a state of the respective subset of the set of multiple storage nodes for the node-level state machine.

Some examples of the method, apparatuses, and non-transitory computer-readable medium described herein may further include operations, features, means, or instructions for instantiating the one or more node-level state machines includes instantiating a respective node-level state machine for each storage node in the cluster of storage nodes.

Some examples of the method, apparatuses, and non-transitory computer-readable medium described herein may further include operations, features, means, or instructions for transitioning, based on performing the update procedure, the cluster-level state machine to a rolling-update state, where the rolling-update state may be associated with serially updating the subsets of the set of multiple storage nodes.

In some examples of the method, apparatuses, and non-transitory computer-readable medium described herein, the cluster-level state machine remains in a rolling-update state while the subsets of the set of multiple storage nodes may be serially updated, and each of the one or more node-level state machines undergoes one or more state transitions while the respective subset of the set of multiple storage nodes for the node-level state machine may be being updated.

Some examples of the method, apparatuses, and non-transitory computer-readable medium described herein may further include operations, features, means, or instructions for initiating, based on the cluster-level state machine entering a rolling-update state for serially updating the set of multiple storage nodes, a preparing state at the one or more node-level state machines, where the set of multiple storage nodes may be prepared for updating while the one or more node-level state machines may be in the preparing state.

Some examples of the method, apparatuses, and non-transitory computer-readable medium described herein may further include operations, features, means, or instructions for initiating an update for a subset of the set of multiple storage nodes based on the cluster-level state machine entering a rolling-update state for serially updating the set of multiple storage nodes, where the node-level state machine of the one or more node-level state machines corresponds to the subset of the set of multiple storage nodes and transitioning, by the node-level state machine, from a preparing state to a configuring state based on the update being initiated for the node-level state machine, where system parameters of the second version may be configured at the subset of the set of multiple storage nodes while the node-level state machine may be in the configuring state.

In some examples of the method, apparatuses, and non-transitory computer-readable medium described herein, a set of multiple node-level state machines of the one or more node-level state machines remain in the preparing state while the node-level state machine transitions from the preparing state to the configuring state.

Some examples of the method, apparatuses, and non-transitory computer-readable medium described herein may further include operations, features, means, or instructions for transitioning, by the node-level state machine, from the configuring state to a migrating state, where values of the system parameters of the first version may be transferred to corresponding system parameters of the second version while the node-level state machine may be in the migrating state.

Some examples of the method, apparatuses, and non-transitory computer-readable medium described herein may further include operations, features, means, or instructions for transitioning, by the node-level state machine, from the migrating state to a restarting state, where the subset of the set of multiple storage nodes may be restarted while the node-level state machine may be in the restarting state and transitioning, by a second node-level state machine of the one or more node-level state machines, from the preparing state to the configuring state based on the node-level state machine exiting the restarting state.

Some examples of the method, apparatuses, and non-transitory computer-readable medium described herein may further include operations, features, means, or instructions for reaching a synchronization point in the update procedure.

Some examples of the method, apparatuses, and non-transitory computer-readable medium described herein may further include operations, features, means, or instructions for pausing the update procedure based on reaching the synchronization point and performing a testing procedure for a service that may be supported by the cluster of storage nodes during the update procedure.

Some examples of the method, apparatuses, and non-transitory computer-readable medium described herein may further include operations, features, means, or instructions for determining that the service may be running during the update procedure as expected based on the testing procedure and resuming the update procedure based on determining that the service may be running as expected.

Some examples of the method, apparatuses, and non-transitory computer-readable medium described herein may further include operations, features, means, or instructions for identifying an error in the service based on the testing procedure and sending, via a user interface, an indication of the error in the service.

Some examples of the method, apparatuses, and non-transitory computer-readable medium described herein may further include operations, features, means, or instructions for receiving, via the user interface, an input that addresses the error in the service and resuming the update procedure based on the error being addressed.

Some examples of the method, apparatuses, and non-transitory computer-readable medium described herein may further include operations, features, means, or instructions for skipping a task associated with the synchronization point, a state associated with the synchronization point, or both, based on reaching the synchronization point.

In some examples of the method, apparatuses, and non-transitory computer-readable medium described herein, the synchronization point may be reached after updating a first storage node of the set of multiple storage nodes and before updating a second storage node of the set of multiple storage nodes and half of the set of multiple storage nodes may have been updated after the first storage node may be updated.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   instantiating, by a data management system, a cluster-level state machine associated with an update procedure for updating software for a cluster of storage nodes from a first version to a second version, wherein the cluster of storage nodes comprises a plurality of storage nodes, wherein the update procedure is configured to serially update subsets of the plurality of storage nodes, and wherein the cluster-level state machine is configured to monitor a performance of the update procedure at a cluster level that spans the plurality of storage nodes;
   instantiating, by the data management system, one or more node-level state machines responsive to the update procedure being initiated, wherein the one or more node-level state machines are configured to monitor the performance of the update procedure at a storage node level that is specific to a respective subset of the plurality of storage nodes; and
   performing, by the data management system, the update procedure for the cluster of storage nodes, wherein:
      a state of the cluster-level state machine reflects a state of the cluster of storage nodes, and
      a state of a node-level state machine of the one or more node-level state machines reflects a state of the respective subset of the plurality of storage nodes for the node-level state machine.

2. The method of claim 1, wherein instantiating the one or more node-level state machines comprises:
   instantiating a respective node-level state machine for each storage node in the cluster of storage nodes.

3. The method of claim 1, further comprising:
   transitioning, based at least in part on performing the update procedure, the cluster-level state machine to a rolling-update state, wherein the rolling-update state is associated with serially updating the subsets of the plurality of storage nodes.

4. The method of claim 1, wherein:
   the cluster-level state machine remains in a rolling-update state while the subsets of the plurality of storage nodes are serially updated, and
   each of the one or more node-level state machines undergoes one or more state transitions while the respective subset of the plurality of storage nodes for the node-level state machine is being updated.

5. The method of claim 1, further comprising:
   initiating, based at least in part on the cluster-level state machine entering a rolling-update state for serially updating the plurality of storage nodes, a preparing state at the one or more node-level state machines, wherein the plurality of storage nodes are prepared for updating while the one or more node-level state machines are in the preparing state.

6. The method of claim 1, further comprising:
   initiating an update for a subset of the plurality of storage nodes based at least in part on the cluster-level state machine entering a rolling-update state for serially updating the plurality of storage nodes, wherein the node-level state machine of the one or more node-level state machines corresponds to the subset of the plurality of storage nodes; and
   transitioning, by the node-level state machine, from a preparing state to a configuring state based at least in part on the update being initiated for the node-level state machine, wherein system parameters of the second version are configured at the subset of the plurality of storage nodes while the node-level state machine is in the configuring state.

7. The method of claim 6, wherein a plurality of node-level state machines of the one or more node-level state machines remain in the preparing state while the node-level state machine transitions from the preparing state to the configuring state.

8. The method of claim 6, further comprising:
   transitioning, by the node-level state machine, from the configuring state to a migrating state, wherein values of system parameters of the first version are transferred to corresponding system parameters of the second version while the node-level state machine is in the migrating state.

9. The method of claim 8, further comprising:
transitioning, by the node-level state machine, from the migrating state to a restarting state, wherein the subset of the plurality of storage nodes are restarted while the node-level state machine is in the restarting state; and
transitioning, by a second node-level state machine of the one or more node-level state machines, from the preparing state to the configuring state based at least in part on the node-level state machine exiting the restarting state.

10. The method of claim 1, further comprising:
reaching a synchronization point in the update procedure.

11. The method of claim 10, further comprising:
pausing the update procedure based at least in part on reaching the synchronization point; and
performing a testing procedure for a service that is supported by the cluster of storage nodes during the update procedure.

12. The method of claim 11, further comprising:
determining that the service is running during the update procedure as expected based at least in part on the testing procedure; and
resuming the update procedure based at least in part on determining that the service is running as expected.

13. The method of claim 11, further comprising:
identifying an error in the service based at least in part on the testing procedure; and
sending, via a user interface, an indication of the error in the service.

14. The method of claim 13, further comprising:
receiving, via the user interface, an input that addresses the error in the service; and
resuming the update procedure based at least in part on the error being addressed.

15. The method of claim 10, further comprising:
skipping a task associated with the synchronization point, a state associated with the synchronization point, or both, based at least in part on reaching the synchronization point.

16. The method of claim 10, wherein the synchronization point is reached after updating a first storage node of the plurality of storage nodes and before updating a second storage node of the plurality of storage nodes.

17. An apparatus, comprising:
a processor; and
memory coupled with the processor, the memory storing instructions executable by the processor to cause the apparatus to:
instantiate, by a data management system, a cluster-level state machine associated with an update procedure for updating software for a cluster of storage nodes from a first version to a second version, wherein the cluster of storage nodes comprises a plurality of storage nodes, wherein the update procedure is configured to serially update subsets of the plurality of storage nodes, and wherein the cluster-level state machine is configured to monitor a performance of the update procedure at a cluster level that spans the plurality of storage nodes;
instantiate, by the data management system, one or more node-level state machines responsive to the update procedure being initiated, wherein the one or more node-level state machines are configured to monitor the performance of the update procedure at a storage node level that is specific to a respective subset of the plurality of storage nodes; and
perform, by the data management system, the update procedure for the cluster of storage nodes, wherein:
a state of the cluster-level state machine reflects a state of the cluster of storage nodes, and
a state of a node-level state machine of the one or more node-level state machines reflects a state of the respective subset of the plurality of storage nodes for the node-level state machine.

18. The apparatus of claim 17, wherein the instructions are further executable by the processor to cause the apparatus to:
transition, based at least in part on performing the update procedure, the cluster-level state machine to a rolling-update state, wherein the rolling-update state is associated with serially updating the subsets of the plurality of storage nodes.

19. A non-transitory, computer-readable medium storing code that comprises instructions executable by a processor of an electronic device to cause the electronic device to:
instantiate, by a data management system, a cluster-level state machine associated with an update procedure for updating software for a cluster of storage nodes from a first version to a second version, wherein the cluster of storage nodes comprises a plurality of storage nodes, wherein the update procedure is configured to serially update subsets of the plurality of storage nodes, and wherein the cluster-level state machine is configured to monitor a performance of the update procedure at a cluster level that spans the plurality of storage nodes;
instantiate, by the data management system, one or more node-level state machines responsive to the update procedure being initiated, wherein the one or more node-level state machines are configured to monitor the performance of the update procedure at a storage node level that is specific to a respective subset of the plurality of storage nodes; and
perform, by the data management system, the update procedure for the cluster of storage nodes, wherein:
a state of the cluster-level state machine reflects a state of the cluster of storage nodes, and
a state of a node-level state machine of the one or more node-level state machines reflects a state of the respective subset of the plurality of storage nodes for the node-level state machine.

20. The non-transitory, computer-readable medium of claim 19, wherein the instructions are further executable by the processor to cause the electronic device to:
transition, based at least in part on performing the update procedure, the cluster-level state machine to a rolling-update state, wherein the rolling-update state is associated with serially updating the subsets of the plurality of storage nodes.

* * * * *